United States Patent [19]

Eisenmenger et al.

[11] 4,366,138

[45] Dec. 28, 1982

[54] CARBON BLACK USEFUL FOR PIGMENT FOR BLACK LACQUERS

[75] Inventors: Edith Eisenmenger, Offenbach; Richard Engel, Waldorf; Gerhard Kühner, Hanau; Reinhold Reck, Maintal; Hans Schaefer, Linsengericht; Manfred Voll, Hanau, all of Fed. Rep. of Germany

[73] Assignee: Deutsche Gold- und Silberscheideanstalt Vormals Roessler, Fed. Rep. of Germany

[21] Appl. No.: 268,560

[22] Filed: Jun. 1, 1981

Related U.S. Application Data

[63] Continuation of Ser. No. 87,139, Oct. 22, 1979, abandoned.

[30] Foreign Application Priority Data

Oct. 25, 1978 [DE] Fed. Rep. of Germany ....... 2846405

[51] Int. Cl.$^3$ ...................... C01B 31/02; C01B 31/00
[52] U.S. Cl. .................................... 423/445; 423/449; 106/307
[58] Field of Search ................ 106/307; 423/449, 450, 423/458, 461, 445

[56] References Cited

U.S. PATENT DOCUMENTS

| | | | |
|---|---|---|---|
| 2,707,273 | 5/1955 | Sweitzer et al. | 106/307 |
| 3,365,637 | 2/1971 | Dennenberg et al. | 106/307 |
| 3,383,232 | 5/1968 | Jordan et al. | 106/307 |
| 3,398,009 | 8/1968 | Deery | 106/307 |
| 3,595,618 | 7/1971 | Kiyonaga et al. | 423/458 |
| 3,978,019 | 8/1976 | Oelmann et al. | 106/307 |

FOREIGN PATENT DOCUMENTS

689447 6/1964 Canada ............................. 106/307

*Primary Examiner*—O. R. Vertiz
*Assistant Examiner*—Gregory A. Heller
*Attorney, Agent, or Firm*—Beveridge, DeGrandi & Kline

[57] ABSTRACT

An oxidized carbon black (gas black) is prepared within the MCC (medium color channel black) area showing primary particle sizes of an average diameter of 16 to 18 nm and a content of volatiles of at least 15% which, as secondary characteristics, has a specific surface area (BET) of 300 to 420 m$^2$/g, an oil absorption (stiff paste) conducted on carbon black powder of 430 to 560 g/100 g, an oil absorption (stiff paste) conducted on carbon black beads of 370 to 450 g/100 g, a pH value of 2 to 5, a nigrometer index of 68 to 72 and a maximum content of volatiles of 25%. The carbon black is used as a pigment in high jet black lacquers.

4 Claims, No Drawings

CARBON BLACK USEFUL FOR PIGMENT FOR BLACK LACQUERS

REFERENCE TO A RELATED APPLICATION

This is a continuation of copending application Ser. No. 87,139 filed Oct. 22, 1979, now abandoned, which is relied on herein.

BACKGROUND OF THE INVENTION

The invention relates to an oxidized retreated carbon black within the MCC area which may be used advantageously as a carbon black pigment for coloring high jet black lacquers.

Such lacquers are used, for example, in the automobile industry, for optical instruments, for solar collectors and the like. In these black lacquers, carbon black is preferred as pigment over all others, because carbon black allows coloring with the highest degree of blackness and comparison to organic pigments, has practically an unlimited resistance to light and heat.

In such high jet lacquer systems, of which the highest requirements are made in regard to degree of blackness, surface and gloss, usually carbon blacks of the HCC area (high color channel black) or the HCF area (high color furnace black) are used, that is to say, carbon blacks are used which are produced according to the channel process or according to the furnace process.

These processes are described in detail in Ullmanns Enzylkopadie der Technischen Chemie [Ullmann's Encyclopedia of Industrial Chemistry], 4th Edition, Vol. 14, p. 636 ff. which is relied on herein for the purpose of including a description of conventional methods of producing carbon blacks.

In the case of the channel process which starts out from natural gas as a raw material, carbon black is produced in a large number of small flames which burn against cooled iron rails (channels) on which the carbon black is then deposited. It is important that the carbon black in this channel process is formed in a gaseous atmosphere which has an excess of atmospheric oxygen. As a result of that, oxygen containing groups with an acid character (pH value about 3) develop on the surface of the carbon black. Because of the uneconomical aspect of this process, in the case of which only 3-6% of the carbon is obtained in the form of carbon black, the channel process is no longer used for practical purposes.

The gas carbon black (gas black) process operates essentially similarly. In that case, instead of natural gas, a carrier gas (coke oven gas, city gas, hydrogen, etc.) loaded with oil vapors is conveyed to the burners. The flames strike against cooled rotating rollers on which the carbon black deposits. In the case of this process too, the formation of carbon black takes place in an atmosphere of excess oxygen and therefore, the carbon black obtained thereby shows an acid reaction in water.

Because of the great similarity to the carbon blacks obtained according to the channel process, carbon blacks produced according to the gas process are also classified with channel blacks.

Since the yields of carbon black in that case are approximately 10 times higher than in the case of the channel process, the gas black process may compete with the furnace process.

The furnace process operates in a closed system:

In a ceramically coated furnace, a hot flame is produced from gas and air into which the carbon black raw material in the form of highly aromatic oils is atomized.

The volume of atmospheric oxygen related to the quantities of gas and oil used is present in a deficient amount.

After the formation of the carbon black, water is sprayed into the reactor and the mixture of gas and carbon black is cooled to about 900° C.

The gas atmosphere, different as compared to the previously mentioned processes, leads to the fact that furnace blacks have fewer surface oxides and show neutral to weakly alkaline reactions (pH value: 7-10).

Since the surface groups of carbon blacks interact with the molecules of the binders, the surface chemistry is of great importance in respect of the ability of a carbon black to be dispersed in a binder for lacquers and this among other things is also decisive for the color value of a lacquer.

Carbon blacks with acid surface groupings are particularly suitable for the overwhelming part of lacquer binders.

Acidic surface oxides may be generated on the furnace blacks or else may be multiplied in case of the channel black types, whenever these carbon blacks are subjected to an oxidative after-treatment. An oxidation may be executed with $NO_2$-air mixtures in the fluidized bed or else with nitric acid in the fluid phase.

The degree of oxidation of a carbon black may be determined subsequently by the determination of the volatiles.

A carbon black according to DIN 53 552 in a platinum crucible with a well closing lid which has a 2 mm hole (crucible according to DIN 51 720), is annealed for 7 minutes at 950° C. in a muffle furnace.

The loss in weight during annealing is stated in percent of the weighed sample and represents the "volatiles" which are considered as a measure of the quantity of surface oxides.

Generally speaking, the carbon blacks are classified according to the size of their primary particles. This particle size may be determined with the electron microscope.

Thereby, the diameters of a large number of particles are determined and the arithmetic mean is calculated on the basis of several electron microscope pictures of the carbon black sample with the help of the semiautomatic particle size analyzer TGZ 3 according to Endter and Gebauer (Carl Zeiss, Oberkochen). The method was developed by F. Endter and H. Gebauer, as described in Degussa, Optic 13, 97–101 (1966) which is relied on herein to show this method. Recent measures in the case of which the object space of the electron microscope is cooled, lead to clearly lower values of the particle size.

The particle diameters stated here are based on measurements without object space cooling, in order to be comparable to data published hitherto.

| Classification of the Carbon Blacks: | | |
|---|---|---|
| Channel Blacks Gas Blacks | Furnace Blacks | Primary Particle Diameters nm |
| HCC | HCF | <15 |
| MCC | RCF | 15–20 |
| RCC | RCF | >20 |

HC = high color
MC = medium color
RC = regular color
C: channel blacks
F: furnace blacks The primary particle size is of great importance because it is responsible for a large series of analytical data and for industrial application data and, not in the least, it is also responsible for the profitability of a carbon black; for a better characterization of a carbon black, various tests procedures are in use:

In view of the use of a carbon black for black lacquers, the determination of the color depth of a carbon black is important.

If carbon blacks of different particle size are compared, then it turns out that types of carbon blacks with coarser particle sizes tend more towards gray, i.e. less color depth than finely dispersed carbon blacks with which one may achieve a greater depth of color.

A measuring method, for the nigrometer index, is described subsequently:

0.1 g of carbon black are carefully ground together with a linseed oil varnish (RAL 848 B) on a glass plate with an elastic steel spatula until a homogenous "standing" paste has formed; at the same time, the oil is added slowly from a 2 ml burette. (For more details, see under oil absorption).

Densified carbon blacks are to be comminuted dry with the spatula prior to the addition of oil.

The paste is painted thickly onto a slide and the light remission of the paste is measured right through the glass with a nigrometer. The recording takes place as the nigrometer index, whereby small numbers state a high degree and large numbers a low degree of depth of color.

The depth of color may also be determined very well by a visual comparison of the paste with standard pastes of known nigrometer indices. For this purpose, the sample and the comparative paste are painted side by side thickly onto a slide and the depth of color is evaluated right through the glass in a very bright light (Leitz lamp).

This process produces particularly good results whenever the sample paste is spread between the paste of a brighter and of a darker standard carbon black. In order to achieve reproducible results, it is assumed that always clear and clean glasses are used.

The connection between particle size and nigrometer index becomes clear from the following listing:

TABLE 1

| Types of Carbon Blacks (Class) | Particle Size (Diameter in nm) | Depth of Color (Nigrometer Index) |
|---|---|---|
| HCC | 13 | 63 |
| HCC | 15 | 68 |
| MCC | 17 | 71 |
| MCC | 20 | 76 |
| RCC | 25 | 80 |

Another, important data for a characterization of carbon black is the specific surface area. It is related to the particle size. In the case of carbon black which have a surface free of scars and pores, the specific surface area is the higher the more finely dispersed a carbon black is. The specific surface may be determined in accordance with BET. (Brunauer, Emmett and Teller).

The surface area of a solid body may be calculated from the $N_2$ adsorption isotherm recorded at the boiling temperature of the liquid nitrogen.

By evaluation of the adsorption curve in the relative pressure area between $p/p_o \sim 0.05$ and $p/p_o \sim 0.2$, the volume VM is obtained, which according to the theory of Brunauer, Emmett and Teller represents the quantity of nitrogen needed for a monomolecular covering.

16.2 $A^2$ are made the basis for the cross sectional area need of a nitrogen molecule. From this one can calculate the surface area of the sample accessible to the $N_2$ molecules. For details, see for example, Brunauer, Emmett and Teller: J.A.C.S. 60, (1938), 309. The BET surface is stated in $m^2/g$.

On the other hand, the purely geometric surface area of a carbon black may also be calculated from electron microscopic determinations of particle sizes.

Deviations between the surface area values determined by adsorption and those calculated from the particle size are conditional on the porosity of the carbon blacks.

The oil requirement offers a help of orientation for the consumer in the case of the selection of various carbon blacks for use in lacquers and dyes. The oil absorption however is influenced by the particle size but also by the surface chemistry and the "structure" of the carbon black. (By "structure" one understands the degree of coalescence of primary particles to larger chain or grapeshaped aggregates.)

The oil absorption (stiff paste) is determined as follows:

0.5 g of carbon black are ground carefully with linseed oil varnish (RAL 848 B) with an elastic steel spatula on a glass plate until a homogenous "stiff paste" has formed.

Thereby, the oil is added slowly from a 2 ml burette. The terminal point of the addition of oil is recognized from the fact that in case of lifting the spatula from the paste, one can draw coneshaped peaks. These peaks do not collapse immediately but only as a result of shock (for example, a small tap on the glass plate).

This is the reason for the term "stiff" paste or also flow point. The oil absorption is stated according to a recalculation of the consumed ml of linseed oil in gram in percent by weight related to the carbon black. The accuracy of the measurement is ±20%.

The values for the oil absorption are generally the higher, the more finely dispersed a carbon black is. Whenever a carbon black powder is densified or changed into a granulate, the values for the oil requirement drop.

By the pH value of a carbon black, is understood to mean the pH value of an aqueous suspension of the carbon black. The determination is made in accordance with DIN 53 200.

For this purpose, 1 g of carbon black is weighed in a 50 ml Erlenmeyer flask, 20 ml of freshly distilled water as much as possible free of $CO_2$ is added and is stirred vigorously with a magnetic stirrer for 2 minutes. Subsequently, the glass electrode is submerged directly into the suspension and after 1 minute the pH value is read from the measuring device. Beaded carbon black must be powdered before being weighed.

The data concerning industrial application of a carbon black are determined in connection with the production of a black lacquer (composition of the ground materials, rheology, dispersibility) and after the production of a test film of lacquer. Decisive values which may be measured for a lacquer film are depth of color, color tone, surface quality, gloss. For determining characteristics for industrial use, first of all a carbon black concentrate in the form of a ground material is produced and is further processed into two test lacquers:

Production of a carbon black concentrate A

In a laboratory ball mill with 500 ml contents with a steel ball filling of 1200 g (diameter: 12 mm), a carbon black concentrate of the following composition is dispersed for 60 hours.

Composition of the ground material:
114.0 g of soya alkyd* medium oil-length
28.0 g of mineral spirits (boiling range: 145-200° C.)
17.1 g of carbon black
159.1 g of grinding base A
Concentration of the binder solution in the grinding base: 40%
Concentration of the carbon black related to the binder: 30%

Test Lacquer B for Examination of the Degree of Dispersion:
For this purpose, the grinding base obtained is made into a lacquer according to the following formulation:
42.6% by weight of grinding base A
46.1% by weight of soya alkyd* medium oil-length
11.3% by weight of mineral spirits (boiling range: 145-200° C.)
100.0% by weight

*Alftalat AS 502, 50% in mineral spirits of the firm Hoechst AG)
Concentration of the binder solution in the test lacquer: 40%
Concentration of the carbon black calculated on the binder: approximately 12%

Baking Enamel Color C for Testing Color data and the Surface Quality
20.5% by weight of grinding base A
39.2% by weight of soya alkyd* with 45% oil length as a 60% xylene solution
24.0% by weight of melamine resin** (55% in butanol)
12.2% by weight of xylene
2.5% by weight of ethyl glycol
1.6% by weight of butanol
100.0% by weight
Carbon black concentration related to the binder: 5%
Concentration of the binder solution: 45%
Ratio alkyd-/melamine resin: 70:30
Baking conditions: 30 minutes at 130° C.
Thickness of dry film: Approximately 35 μm

*Scadonal 120 × 60, Scado Archers-Daniels, 4470 Meppen
**Maprenal MF 80, Hoechst AG The following examinations for industrial application are carried out: the influence of the carbon black to be tested on the rheological behavior of a binder system may be evaluated on the basis of the grinding base A, whereby low viscosities mean that concentrates with a higher carbon black content may be produced.

The examination of the degree of dispersibility (granulation) is accomplished with the grindometer according to DIN 53 203 in the test lacquer B.

Jetness and color undertone are determined on the basis of a lacquer film (baked lacquer C). The 24-filter-color measuring device RFC 3, of the firm Zeiss, Oberkochen, which is prepared especially for the measurement of blackness, serves for this purpose (cf. Degussa, series of reports Pigments, No. 65, Photometrical Measurement of Blackness of Apr. 4, 1977).

The measurements are accomplished in each case on a glass plate (70×70×1.05 mm), which is coated on the reverse side with the test lacquer C.

Measuring conditions: Type of light D 65, 10° observer.

With the help of the measured standard color values X, Y, Z, the degree of blackness M, a measure for the jetness, is calculated according to the following equation:

$$M = 104.4 - 100 \log Y.$$

In the case of a "darker" black, one will obtain higher numerical values for the degree of blackness M.

Frequently, the carbon blacks have a color undertone, that is to say they have for example, a touch of blue or a touch of brown. A carbon black with a touch of blue in the case of visual evaluation, leads to a higher classification of the depth of color. The color dependent degree of blackness, $M_F$, which is determined according to the following equation:

$$M_F = 100 \ [2-\log (63.54 \ Y - 41.07X - 14.51Z)]$$

is in good agreement with the visual impression.

The equations have been fixed according to the latest draft for the DIN standard No. 6174.

As a measure for the color tone of black lacquers, the difference $$M_F - M = \Delta M,$$

is valid, whereby higher values for $\Delta M$ represent a stronger blue tone.

Further data of industrial application are likewise found in the lacquer film (baking enamel C):

The surface quality is evaluated in the polarized light with a direct light microscope at 100 times enlargement.

The gloss is measured with the multi-angle-gloss meter according to Gardner and at a measuring angle of 20° or with a multiflex galvanometer according to Lange at an angle of 45°.

It has been known, for the production of very jet black lacquers to use HC carbon blacks in beaded form with the following combination of characteristics:

| Carbon Black (beaded) No. | 1 | 2 | 3 |
| --- | --- | --- | --- |
| Class | HCC (Channel black) | HCC (Gas Black) | HCF (Furnace Black) |
| Average Particle diameter (nm) | 14 | 13 | 13 |
| Volatiles (%) | 10 | 16 | 9.5 |
| Specific Surface area BET (m²/g) | 695 | 430 | 560 |
| Nigrometer Index | 65 | 63 | 64 |
| M-value | 188 | 204 | 200 |
| $M_F$-value | 201 | 225 | 215 |
| Bluish Tone (ΔM) | 13 | 21 | 15 |
| Gloss 20° Gardner (%) | 77 | 80 | 65 |

For the producer of high jet lacquers, it is important above all to use carbon black varieties which combine a high depth of color (M-value) with a distinct bluish undertone (ΔM-value). This requirement could be fulfilled hitherto only by types of carbon black from the HCC or HCF area. HC blacks because of their fine dispersibility as compared to coarse particle carbon blacks on the other hand have a series of disadvantages during processing:

difficult dispersibility: From this, extended processing times result. Otherwise not completely dispersed components lead to disturbed lacquer surfaces, loss of gloss and cloudiness.

Increased oil requirement: This means a higher requirement of binder and lower concentration of carbon black in case of the production of grinding base.

DESCRIPTION OF THE INVENTION

Surprisingly, it has been found that a carbon black from the MCC area, that is to say a considerably coarse carbon black gives results in industrial application which had hitherto been reserved for the HC area; the data measured on an MCC carbon black with a 17 nm particle size show this by way of example:

| Carbon black (beaded) No. | 4 |
|---|---|
| Class | MCC (gas black) |
| Average Particle diameter (nm) | 17 |
| Volatiles (%) | 17 |
| Specific Surface Area BET (m²/g) | 370 |
| Nigrometer Index: | 70 |
| M-value | 197 |
| $M_F$-value | 223 |
| Bluish undertone ($\Delta M$) | 26 |
| Gloss 20° Gardner (%) | 83 |

This surprising finding that the M and $M_F$ value of this carbon black lie on the same level as in the case of HC carbon black and the values for gloss and blue tone even surpass the value of HC carbon black, is made more clear whenever one compares them with a known carbon black from the MCC area which is at the border line to the RCC area:

| Carbon Black (beaded) No. | 5 |
|---|---|
| Class | MCC/gas black |
| Average particle diameter (nm) | 20 |
| Volatiles (%) | 15 |
| Specific Surface Area BET (m²/g) | 240 |
| Nigrometer Index | 75 |
| M-value | 177 |
| $M_F$-value | 186 |
| Blue Undertone ($\Delta M$) | 9 |
| Gloss 20° Gardner (%) | 83 |

Particularly clear in the case of the transition from carbon black No. 4 to black No. 5 is the drop in the blue tone. This result is expressed also in the case of a visual color matching of the lacquer samples: While the carbon black (No. 4) according to the invention has practically the same rank as the very much more finely dispersed HCC carbon black No. 2, a very much lower classification results far the MCC gas black No. 5. The M values also prove this:

The $M_F$ value of the carbon black according to the invention at 223 lies above the $M_F$ value of the HC carbon black Nos. 1 and 3, and scarcely below the $M_F$ value of the HC carbon black No. 2, while the M values of carbon black No. 5 lie far below it.

Obviously, the blue undertone of carbon black No. 4, which considerably surpasses all other comparative carbon blacks has a positive effect on the evaluation of the depth of color in the test lacquer. Such a result could not be expected, since the development of the depth of color cannot be read from the nigrometer index. The nigrometer index of the carbon black No. 4 according to the invention, being 70, lies on the level corresponding to the particle size of 17 nm (Table 1).

Frequently, a carbon black powder is used instead of a beaded carbon black. A comparison of the carbon black in powder form according to the invention with corresponding HC carbon black, also brings in this case characteristic results in the case of the color examination of baked lacquer C.

| Carbon black (powder form) No. | 2a | 3a | 4a | 5a |
|---|---|---|---|---|
| | | acc. to the invention | | |
| Class | HCC | HCF | MCC | MCC |
| Average particle diameter (nm) | 13 | 13 | 17 | 20 |
| Volatiles (%) | 16 | 9.5 | 17 | 15 |
| Specific Surface Area BET (m²/g) | 430 | 560 | 370 | 240 |
| Nigrometer Index | 63 | 64 | 70 | 75 |
| M-value | 202 | 191 | 190 | 173 |
| $M_F$-value | 216 | 202 | 206 | 178 |
| Blue Tone ($\Delta M$) | 14 | 11 | 16 | 5 |
| Gloss 20° Gardner % | 80 | 48 | 81 | 83 |

A further characteristic of the carbon black according to the invention is the lower oil requirement as compared to known HCC carbon blacks:

| Class of carbon black | 2/2a | 4/4a (acc. invention) |
|---|---|---|
| Class of carbon black | HCC | MCC |
| Average particle size (nm) | 13 | 17 |
| Oil Requirement (of powdered carbon black) g/100 g | 670 | 480 |
| Oil Requirement (of beaded carbon black) ml/100 g | 500 | 400 |

In order to obtain the new carbon black, a basic carbon black with the required particle size is produced according to the carbon black process as described in Ullmann's Encyclopedia of Industrial Chemistry, Volume 14, 4th Edition, page 640 ff, and is then subjected to an oxidizing after-treatment.

According to the gas carbon black (gas black) process, a basic carbon black with the nigrometer index in the area of 68 to 73 is produced. Then the mean particle size lies at 16 to 18 nm. Further data which characterizes such carbon blacks in more detail are:

| Specific Surface Acc. to BET: | 185–240 m²/g |
|---|---|
| Volatiles: | 4.5–7.5% |
| Oil Absorption | 640–740 g/100 g |
| pH value: | 3–5 |

This carbon black is oxidized in a continuously operating in a fluidized or solid bed reactor. A mixture of $NO_2$ and air or of an other oxygen containing gas or a liquid oxidation agent such as, for example nitric acid, serves as oxidation agent.

When operating with gaseous oxidation agents, a maximal temperature of 300° C. should not be exceeded, because otherwise a reduction of the volatile components to a considerable extent occurs by splitting off CO and $CO_2$, thereby rendering difficult the attainment of the desired degree of oxidation. The degree of oxidation which results from the value of the volatile components is determined by the residence time and concentration conditions of the reaction components. For the carbon black according to the invention, the oxidation conditions are selected such that at least 15% of volatiles are obtained. A higher content of volatiles than about 25% can be produced but is not required. It would only drastically extend the oxidation time. After the oxidation, the carbon black is treated with hot air up to maximally 280° C. in order to remove from the surface of the carbon black any nitric oxide still adsorbed.

The carbon black obtained is packed either after densification and degassing according to known processes as a carbon black powder or is transferred in rotating drums into carbon black granulates (Ullmann's Encyclopedia of Industrial Chemistry, Volume 14, 4th Edition, pages 639, 640).

A method of operation in the case of which the oxidation is carried out with a mixture of $NO_2$ and air in the fluidized bed has proven to be particularly suitable. In a first container, a basic carbon black mentioned above is first fluidized with air and then reaches the reactor. The mean gas velocity in the fluidized bed amounts to 1 to 2 cm/sec. The $NO_2$ concentration in the gaseous oxidation agent is measured in dependence on the throughput (flow rate) quantity of the carbon black. It is adjusted such that the desired degree of oxidation will be obtained. The dependence between the throughput of the carbon black and $NO_2$ concentration to be taken into consideration in the case of a provided content of volatiles of 17% is shown in the following table.

| Volatiles % | Carbon black (kg/h) | $NO_2$ (volume %) |
|---|---|---|
| 17 | 18 | 7.5 |
| 17 | 30 | 9.5 |
| 17 | 37 | 11.0 |

Throughputs of carbon black above or below it require a corresponding adaption of the $NO_2$ content in the oxidation gas in order to achieve the desired degree of oxidation.

It turned out that for the $NO_2$ content in the $NO_2$/air mixture and in the case of production of carbon black according to the invention with 15 to 25% of volatiles, an upper limit of 14.0 volume % and a lower limit of 2.5 volume % must not be exceeded nor fallen short of. The throughput of carbon black in the case of a continuous method of operation must be adjusted such that with a reactor type with which maximally 30 kg/h of carbon black can be put through in order to achieve 17% of volatiles by means of 9.5% of $NO_2$, at the upper limit of $NO_2$ content of 75 kg/h corresponding to 250% of the standard, and at the lower limit of $NO_2$ content 7 kg/h corresponding to about 25% of the standard, are put through.

As a result of the exothermal reaction, the reaction temperature establishes in dependence on the concentration of reactants; it must not exceed 300° C. The oxidized carbon black is subsequently treated with hot air at maximally 280° C. in order to remove adsorbed nitric oxides.

It is essential for the execution of the process in case of the oxidation, therefore and independently of a special technology, such as dry or wet oxidation, to dimension the residence time of the carbon black in the oxidation zone and the supply of oxidation agent at temperatures up to 300° C. in such a way that the desired degree of oxidation will be obtained. The hot air treatment up to maximally 280° C. follows. The predetermined particle size in the basic carbon black is maintained essentially unchanged.

As a result of the previously determined processing conditions, one will achieve additionally that more closely characterizing, but secondary material data of the carbon blacks according to the invention, such as specific surface, oil requirement, pH value and nigrometer index lie in the following areas favorable for the intended applications:

| | |
|---|---|
| Specific Surface Area (BET) | 300–420 $m^2/g$ |
| Oil absorption (as carbon black powder) | 430–560 g/100 g |
| Oil absorption (as carbon black beads) | 370–450 g/100 g |
| pH Value | 2–5 |
| Nigrometer Index | 68–72 |
| Maximum content of volatiles | 25% |

Consequently the invention relates to an oxidized carbon black within the MCC area which is characterized by primary particle sizes of a mean diameter of 16 to 18 nm and a content of volatiles of at least 15% and which has as secondary characteristics

| | |
|---|---|
| A specific surface (BET) | 300–420 $m^2/g$ |
| An oil absorption (as stiff paste) carbon black powder) | 430–560 g/100 g |
| An oil absorption (as carbon black beads) | 370–450 g/100 g |
| a pH value | 2–5 |
| A nigrometer index | 68–72 and |
| A maximum content of volatiles components | 25% |

A preferred embodiment of the invention pertains to a carbon black with a mean primary particle diameter of 17 nm and a content of volatiles of 17% as primarily important characterizing values as well as with the secondary characterizing data stated above.

The use of the carbon black according to the invention as pigments in deep colored black lacquers constitutes a further object of the invention.

For a carbon black according to the present invention as compared to HC carbon black, a series of advantages result which lie both in the economic field as well as on the side of quality:

1. A coarser carbon black (MCC) may be produced with a higher hourly performance and at a better yield than a finely dispersed one (HCC). (Values for HCC carbon blacks set at equal to 100):

| | HCC carbon Black | MCC carbon black |
|---|---|---|
| Particle diameter (nm) | 13 | 17 |
| yield | 100 | 167 |
| hourly performance | 100 | 200 |

2. The viscosity behavior of the carbon blacks according to the invention is considerably more favorable than that of an HCC carbon black. A paste with 18% carbon black in a 37.5% soya-alkyd resin solution in mineral spirits resulted for the carbon black according to the invention in a visibly lower viscosity. The measuring was accomplished with the rotational viscosity meter RV 11 (Haake, Berlin) at 20° C. and 433 $sec^{-1}$.

| | HCC carbon black | MCC carbon black acc. to invention |
|---|---|---|
| particle size (nm) | 13 | 17 |
| volatiles (%) | 15 | 16 |
| viscosity (mPas) | approx. 900 | approx. 300 |

3. The favorable viscosity behavior of the carbon black according to the invention and in the case of an equal expenditure for dispersion permits higher carbon black concentrations and thus leads to an improved profitability.

4. The surface quality of the lacquer film with the carbon black according to the invention is evaluated better in comparison to lacquer film surfaces which are filled with finely dispersed HCF carbon blacks.

5. The development of gloss in the case of lacquers with the carbon black according to the invention is better than in the case of HCC and HCF carbon blacks.

6. In the tested systems of binders, no flocculation whatever is observed.

7. The great surface activity of finely dispersed carbon blacks may lead for example, in the nitrocellulose system to premature gelling. This disturbing effect is not observed in the case of the carbon black according to the invention.

SPECIFIC EXAMPLES

The following examples are illustrative of the present invention:

The basic carbon black I, II and III were produced in accordance with carbon black processes known per se and were then oxidized immediately after the production. These basic carbon blacks have the following characteristics:

| Carbon blacks | I | II | III |
|---|---|---|---|
| Mean Primary Particle Size (nm) | 16 | 17 | 18 |
| Specific Surface area acc. to BET (m$^2$/g) | 240 | 215 | 185 |
| Nigrometer Index | 68 | 71 | 73 |
| Oil absorption (g/100 g) | 740 | 680 | 640 |
| Volatiles (%) | 6.1 | 5.8 | 6.2 |
| pH Value | 3.0 | 4.0 | 4.5 |

EXAMPLE 1

The basic carbon black II was then oxidized as described above with a mixture of 9.5 volume % of NO$_2$ and air. 30 kg/h of carbon black were put through. The mean reaction temperature was 225° C. The powder carbon black No. 4a was obtained with the following data:

| | Carbon black 4a |
|---|---|
| Mean Primary Particle Size (nm) | 17 |
| Volatiles Components (%) | 17 |
| Specific Surface area acc. to BET (m$^2$/g) | 370 |
| Nigrometer Index | 70 |
| Oil absorption (g/100 g) | 480 |
| pH Value | 2.5 |
| The examination in test lacquer C resulted in: | |
| M-value | 190 |
| M$_F$-value | 206 |
| Blue Undertone (ΔM) | 16 |
| Gloss 20° Gardner (%) | 81 |

EXAMPLE 2

Correspondingly, the same basic carbon black II was then oxidized with a mixture of 10 volume % of NO$_2$ and air. 52 kg/h of carbon black were put through. The mean reaction temperature lay at 230° C. Carbon black powder No. 6 was obtained with

| | Carbon black 6 |
|---|---|
| Mean Particle Size (nm) | 17 |
| Volatiles | 14 |
| Specific Surface area BET (m$^2$/g) | 340 |
| Migrometer Index | 71 |
| Oil absorption (g/100 g) | 500 |
| pH value | 3.2 |
| The examination in the test lacquer C resulted in: | |
| M-value | 179 |
| M$_F$-value | 189 |
| Blue Undertone ΔM | 10 |
| Gloss 20° Gardner (%) | 81 |

The larger throughput leads to a lower degree of oxidation so that in the case of a testing of industrial application, the values for color depth of the carbon black 4a and thus the level of the HC carbon blacks were no longer reached.

EXAMPLE 3

The basic carbon black III was then oxidized with a mixture of 10 volume % of NO$_2$ and air. 32 kg/h of carbon black were put through. The mean reaction temperature lay at 240° C. The powdered carbon black 7 was obtained with:

| | Carbon black 7 |
|---|---|
| Mean Particle Size (nm) | 18 |
| Volatiles (%) | 18 |
| Specific Surface area BET (m$^2$/g) | 360 |
| Nigrometer Index | 71 |
| Oil absorption (g/100 g) | 450 |
| pH Value | 2.3 |
| The examination in the test lacquer C resulted in: | |
| M-value | 186 |
| M$_F$-value | 202 |
| Blue Undertone ΔM | 16 |
| Gloss 20° Gardner (%) | 82 |

EXAMPLE 4

The basic carbon black I was then oxidized with a mixture of 10 volume % NO$_2$ and air. 32 kg/h of carbon black were put through. The mean reaction temperature lay at 240° C. The powdered carbon black powder No. 8 was obtained with

| | Carbon black 8 |
|---|---|
| Mean Particle Size (nm) | 16 |
| Volatiles (%) | 15 |
| Specific Surface area BET (m$^2$/g) | 395 |
| Nigrometer Index | 68 |
| Oil absorption (g/100 g) | 530 |
| pH Value | 2.8 |
| The examination in the test lacquer C resulted in: | |
| M-value | 192 |
| M$_F$-value | 210 |
| Blue Undertone ΔM | 18 |
| Gloss 20° Gardner (%) | 82 |

EXAMPLE 5

The basic carbon black II was then oxidized with a mixture of 7.5 volume % of NO$_2$ and air, 18 kg/h of carbon black were put through. The mean reaction temperature lay at 215° C. The carbon black powder No. 9 was obtained.

|  | Carbon Black 9 |
|---|---|
| Mean Particle Size (nm) | 17 |
| Volatiles (%) | 17 |
| Specific surface area (m²/g) | 350 |
| Nigrometer Index | 70 |
| Oil absorption (g/100 g) | 460 |
| pH Value | 2.5 |
| The examination in the test lacquer C resulted in: | |
| M-value | 188 |
| M$_F$-value | 205 |
| Blue Undertone M | 17 |
| Gloss 20° Gardner (%) | 83 |

Despite the production conditions changed as compared to Example 1, the carbon black No. 9 on the basis of the mean particle size of 17 nm and on the basis of the content of volatiles of 17%, shows the high values for depth of color, blue undertone and gloss already determined in the case of Example 1. The unexpected results from the point of view of industrial application in the above described test lacquer system were confirmed in other binder systems:

Lacquer System D

The examination was carried out in a cross-linking heat cured acrylate resin. First of all, always about 150 g of grinding base of the following composition were produced in a 500 ml laboratory ball mill with 1200 g of 12 mm steel balls in 40 hours (data in g):

| Carbon Black Beads | Carbon Black 3 | Carbon Black 4 |
|---|---|---|
| Class | HCF | MCC (acc. invention) |
| Carbon Black Content | 10 | 12 |
| cross-linking, Heat-cured Acrylate Resin in 50% Butanol/Xylene | 97 | 96 |
| Xylene | 18 | 18 |
| Ethyl Glycol Acetate | 18 | 18 |
| n-Butanol | 5 | 5 |
| Concentration of the Binder Solution (%) | 35.1 | 35.2 |
| Carbon Black Concentration related to the Binder (%) | 20.6 | 25.0 |

The grinding base was then lacquered up in the following manner (in % by weight):

|  | Carbon Black No. 3 HCF | Carbon Black No. 4 MCC (acc. invention) |
|---|---|---|
| Grinding base | 14.8 | 12.5 |
| Cross-linking Heat cured Acrylate Resin in 50% Butanol/Xylene | 40.3 | 41.9 |
| Xylene | 19.8 | 20.2 |
| Ethyl Glycol Acetate | 19.8 | 20.2 |
| Butyl Glycol Acetate | 3.3 | 3.2 |
| Silicone Oil (1% in Xylene) | 2.0 | 2.0 |
|  | 100.0 | 100.0 |
| Carbon Black Concentration related to the Binder (%) | 4 | 4 |
| Binder Concentration in the Lacquer Dye: (%) | 25 | 25 |

The baking conditions were: 30 min. at 180° C.
For measuring the color data, the surface of the lacquer was adduced directly. It was found:

| Lacquer film with Carbon Black No. from class | 3 HCF | 4 MCC (acc. invention) |
|---|---|---|
| particle size (nm) | 13 | 17 |
| M-value | 179 | 171 |
| M$_F$-value | 190 | 184 |
| Blue Undertone (ΔM) | 11 | 13 |
| Gloss 20° Gardner (%) | 70 | 79 |
| Grindometer Value (Ground Material) μm | 22 | 13 |

Since in comparison to carbon black No. 3, the carbon black No. 4 according to the invention has a lower grindometer value, the lacquer film produced from it shows a considerably smoother surface (cf. FIGS. 1 and 2) and thus a higher gloss. For this reason and because of the higher blue tone, the lacquer film with carbon black No. 4 is classified visually as one with greater depth of color as compared to that with carbon black No. 3.

Lacquer System E

In this case nitrocellulose was used as a binder. In a 350 ml laboratory kneader (kneading time: 50 min.), concentrates of the following composition were produced (data in g):

| Quantity of Carbon Black | 20 |
|---|---|
| Nitrocellulose Chips (with 20% Dibutyl Phthalate) | 72 |
| Dibutyl Phthalate | 17 |
| Barium Octoate (50% in Xylene) | 6 |
| Ethanol/Butyl acetate (3:1) | 14 |

Always 20 g of the concentrate were dissolved in 80 g of butyl acetate and a 200 μm wet film was put on glass and with the exception of the gloss, was measured through.

| Carbon Black No. | 3 | 4 |
|---|---|---|
| Class | HCF | MCC (acc. to invention) |
| Particle Size | 13 | 17 |
| M-value | 246 | 238 |
| M$_F$-value | 259 | 258 |
| Blue Tone (ΔM) | 13 | 20 |
| Gloss 45° Lange (%) | 21 | 64 |

In this system, the color dependent degree of blackness M$_F$ of the carbon black according to the invention reaches the value of the more finely dispersed comparative carbon black; blue tone and gloss of the surface of the film exceed the comparative carbon black by far.

We claim:

1. An oxidized channel type carbon black within the MCC, medium color channel black, area comprising finely divided primary particles with an average diameter of 16 to 18 nm a content of volatiles of at least 15% and at maximum of 25% and having the following secondary characteristics:

| Specific surface area (BET) | 300–420 m²/g |
|---|---|
| Oil absorption (stiff paste) conducted on carbon black powder | 430–560 g/100 g |
| pH value | 2–5 |

| -continued | |
| --- | --- |
| Nigrometer index | 68-72 | said black having been produced from gas carbon black by burning a carrier gas loaded with oil to produce a gas carbon black having a nigrometer index of 68 to 73 corresponding to a mean particle size in the range of 16 to 18 nm and the following secondary characteristics:

| | |
| --- | --- |
| Specific surface area (BET) | 185-240 m²/g |
| Volatiles | 4.5-7.5% |
| Oil absorption conducted on carbon black powder | 640-740 g/100 g |

| -continued | |
| --- | --- |
| pH | 3-5 | and thereafter subjecting said black to oxidation as an after treatment at a temperature not exceeding a maximal temperature of 300° C.

2. A carbon black as defined in claim 1, wherein the mean primary particle diameter is 17 nm and the content of volatiles is 17%.

3. The carbon black of claim 1, wherein the after treatment is carried out by heating in the presence of nitrogen oxide at a temperature of up to 300° C.

4. The carbon black of claim 1, wherein the after treatment is carried out by heating in the presence of nitric acid.

* * * * *